US008553787B2

(12) United States Patent
Zhou et al.

(10) Patent No.: US 8,553,787 B2
(45) Date of Patent: Oct. 8, 2013

(54) MULTIPLE INPUT MULTIPLE OUTPUT (MIMO) COMMUNICATION SYSTEM FOR FEEDFORWARDING INTERFERENCE VECTOR INDICATOR

(75) Inventors: Yongxing Zhou, Yongin-si (KR); Joon-Il Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 525 days.

(21) Appl. No.: 12/812,550

(22) PCT Filed: Jan. 9, 2009

(86) PCT No.: PCT/KR2009/000121
§ 371 (c)(1),
(2), (4) Date: Aug. 9, 2010

(87) PCT Pub. No.: WO2009/088248
PCT Pub. Date: Jul. 16, 2009

(65) Prior Publication Data
US 2010/0329371 A1    Dec. 30, 2010

(30) Foreign Application Priority Data
Jan. 11, 2008 (CN) .......................... 2008 1 0000450
Jan. 8, 2009 (KR) ........................ 10-2009-0001393

(51) Int. Cl.
*H04L 27/28* (2006.01)
(52) U.S. Cl.
USPC .......................................... 375/260; 375/267
(58) Field of Classification Search
USPC .......................................... 375/260, 267, 299
See application file for complete search history.

(56) References Cited

U.S. PATENT DOCUMENTS

| 2007/0097856 | A1 | 5/2007 | Wang et al. |
| 2007/0165738 | A1 | 7/2007 | Barriac et al. |
| 2009/0046569 | A1* | 2/2009 | Chen et al. ..................... 370/203 |
| 2009/0323840 | A1* | 12/2009 | Lee et al. ...................... 375/260 |
| 2010/0195594 | A1* | 8/2010 | Seo et al. ...................... 370/329 |

FOREIGN PATENT DOCUMENTS

| JP | 2007-110664 | 4/2007 |
| KR | 10-2001-0047396 | 6/2001 |
| KR | 10-2005-0020576 | 3/2005 |
| KR | 10-2007-0042099 | 4/2007 |
| KR | 10-2008-0022031 | 3/2008 |

OTHER PUBLICATIONS

Lim, et al., "The PMI Restriction for the Downlink Closed-Loop MIMO," *In Contribution to the IEEE 802.16 Broadband Wireless Access Working Group Project*, submitted May 5, 2008, pp. 2-6.
International Search Report issued on Aug. 25, 2009, in corresponding International Application No. PCT/KR2009/000121 (2 pages).
Written Opinion issued on Aug. 25, 2009, in corresponding International Application No. PCT/KR2009/000121 (3 pages).

* cited by examiner

*Primary Examiner* — Emmanuel Bayard
(74) *Attorney, Agent, or Firm* — NSIP Law

(57) ABSTRACT

Provided are a base station configured to provide an interference vector indicator to a terminal, and the terminal configured to recognize at least one remaining precoding vector using the interference vector indicator. Each of the base station and the terminal may configure a mapping table between at least one bit for the interference vector indicator indicating the at least one remaining precoding vector, and a plurality of vectors included in a codebook, based on a probability that the plurality of vectors may be included in a precoding matrix. In this instance, the base station may generate the interference vector indicator using the mapping table, and the terminal may recognize the at least one remaining precoding vector using the mapping table. The mapping table may be differently configured according to various modes.

20 Claims, 6 Drawing Sheets

FIG. 2

| $U_k$ | $U_i$ | $U_j$ | ...... | $U_m$ |
|---|---|---|---|---|
| $\log_2(Nq)$ bits | $\log_2(Nq)$ bits | $\log_2(Nq)$ bits | ...... | $\log_2(Nq)$ bits |

MULTIPLE INPUT MULTIPLE OUTPUT (MIMO) COMMUNICATION SYSTEM FOR FEEDFORWARDING INTERFERENCE VECTOR INDICATOR

TECHNICAL FIELD

The following description relates to a multiple input multiple output (MIMO) communication system including a base station configured to feedforward an interference vector indicator, and a terminal configured to recognize a precoding vector corresponding to another terminal based on the interference vector indicator.

BACKGROUND ART

Currently, researches are being conducted to provide various types of services such as multimedia services and to transmit a higher quality of data at higher rate in a wireless communication environment. Accordingly, technology associated with multiple input multiple output (MIMO) communication systems using multiple channels are in rapid development.

In a MIMO communication system, a base station may use a spatial division multiplexing (SDM) scheme and a spatial division multiplexing access (SDMA) scheme. For example, the base station may simultaneously transmit a plurality of data streams via a plurality of antennas according to the SDM scheme, and may transmit the plurality of data streams to multiple users via the plurality of antennas according to the SDMA scheme.

To effectively transmit the plurality of data streams using the plurality of antennas, the base station may need to verify channel information associated with downlink channels formed between the plurality of antennas and users. Accordingly, the users may feed back, to the base station, channel information associated with the downlink channels. The base station may configure a precoding matrix for the users based on the channel information. In this instance, the base station may perform beamforming of the data streams based on a plurality of precoding vectors included in a precoding matrix.

The plurality of precoding vectors may act as interference with respect to each other. The base station may feedforward, to a specific user, an indicator with respect to a precoding vector for the specific user and an indicator with respect to a remaining precoding vector. For example, when active users correspond to user A and user B, and a rank is two, it may be assumed that X denotes a precoding vector for the user A and Y denotes a precoding vector for the user B. In this case, the base station may inform the user A about that the precoding vector is X and an interference vector is Y, and may also inform the user B about that the precoding vector is Y and the interference vector is X.

The above feedforward processing may increase overhead in a communication system and thus there is a desire for technology that may effectively perform a feedforward process.

DISCLOSURE

Technical Solutions

In one general aspect, a communication method of a base station in a multiple input multiple output (MIMO) communication system, includes generating a precoding vector indicator indicating a target precoding vector for a target user among precoding vectors included in a precoding matrix, configuring a mapping table between at least one bit for an interference vector indicator indicating at least one remaining precoding vector and a plurality of vectors included in a codebook, based on a probability that the plurality of vectors may be included in the precoding matrix, and generating the interference vector indicator using the mapping table.

The base station may adaptively change a mode of constituting the mapping table, and may also dynamically change a number of bits for the interference vector indicator as well as the mapping table according to the mode of constituting the mapping table.

The configuring may include configuring the mapping table by classifying the plurality of vectors based on the probability that the plurality of vectors may be included in the precoding matrix. The above probability may be predicted based on a similarity between the plurality of vectors and the target precoding vector, or interference of the vectors with respect to the target precoding vector, and configuring the mapping table.

The configuring may include configuring the mapping table to separately classify orthogonal vectors with respect to the target precoding vector among the plurality of vectors, or may include configuring the mapping table to separately classify vectors having a relatively high probability to be included in the precoding matrix compared to a threshold and vectors having a relatively low probability to be included in the precoding matrix compared to the threshold, among the plurality of vectors.

In another general aspect, a communication method of a terminal for a target user in a MIMO communication system, includes recognizing a target precoding vector for the target user among precoding vectors included in a precoding matrix, based on a precoding vector indicator received from a base station, configuring a mapping table between at least one bit for an interference vector indicator indicating at least one remaining precoding vector and a plurality of vectors included in a codebook, based on a probability that the plurality of vectors may be included in the precoding matrix, and recognizing the at least one remaining precoding vector by analyzing the interference vector indicator received from the base station based on the mapping table.

In still another general aspect, a base station for a MIMO communication system, includes, when precoding vectors included in a precoding matrix are classified into a target precoding vector for a target user and at least one remaining precoding vector, a mapping table configuring module to configure a mapping table between at least one bit for an interference vector indicator indicating the at least one remaining precoding vector and a plurality of vectors included in a codebook, based on a probability that the plurality of vectors may be included in the precoding matrix, an indicator generating module to generate a precoding vector indicator indicating the target precoding vector, and to generate the interference vector indicator using the mapping table, and an indicator providing module to provide the precoding vector indicator and the interference vector indicator to the target user.

In yet another general aspect, a terminal for a target user in a MIMO communication system, includes when precoding vectors included in a precoding matrix are classified into a target precoding vector for a target user and at least one remaining precoding vector, an indicator receiving module to receive a precoding vector indicator and an interference vector indicator from a base station, a mapping table configuring module to configure a mapping table between at least one bit for an interference vector indicator indicating the at least one remaining precoding vector and a plurality of vectors included in a codebook, based on a probability that the plurality of vectors may be included in the precoding matrix, and a vector recognizing module to recognize the target precoding vector based on the precoding vector indicator, and to recognize the at least one remaining precoding vector by analyzing the interference vector indicator using the mapping table.

Advantageous Effect

According to embodiments, a base station and a terminal may configure a mapping table by predicting a probability that a plurality of vectors included in a codebook may be included in a precoding matrix. Accordingly, it is possible to decrease a number of bits for an interference vector indicator, and to represent an interference vector well.

According to embodiments, a base station and a terminal for a target user may employ, as criteria, a similarity between a plurality of vectors and a target precoding vector or interference of the vectors with respect to the target precoding vector. Accordingly, it is possible to more accurately predict a probability that a plurality of vectors included in a codebook may be included in a precoding matrix.

According to embodiments, a base station and a terminal may adaptively determine a mode of constituting a mapping table and thus may transmit and receive an interference vector indicator having an optimized form.

BRIEF DESCRIPTION OF DRAWINGS

FIG. 2 is a diagram illustrating an example to describe a precoding vector indicator and an interference vector indicator.

BEST MODE

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
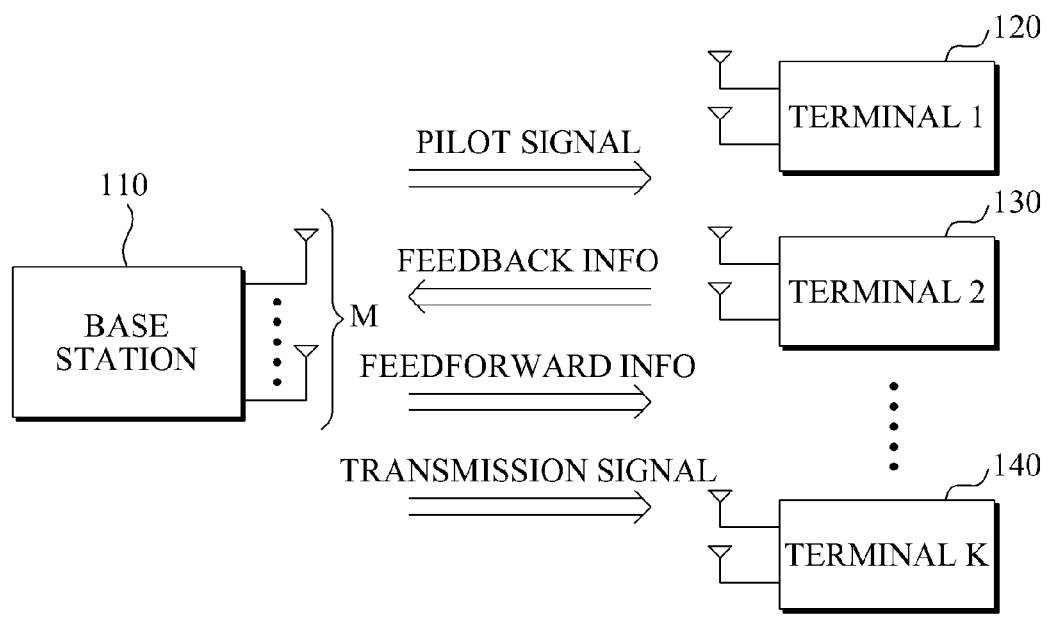
FIG. 1 is a diagram illustrating an example of a multi-user multiple input multiple output (MIMO) communication system.

FIG. 1 illustrates an example of a multi-user multiple input multiple output (MIMO) communication system.

Referring to FIG. 1, the multi-user MIMO communication system may include a single base station 110 and a plurality of terminals (1, 2, K) 120, 130, and 140. M transmit antennas may be installed in the base station 110. A single or at least two receive antennas may be installed in each of the terminals (1, 2, K) 120, 130, and 140.

Channels (downlink channels or uplink channels) may be formed between the base station 110 and the plurality of terminals (1, 2, K) 120, 130, and 140. The base station 110 and each of the terminals (1, 2, K) 120, 130, and 140 may transmit and receive a signal via a formed channel.

The base station 110 may transmit a single or at least two data streams to each of the terminals (1, 2, K) 120, 130, and 140. The base station 110 may generate a transmission signal by performing beamforming of a plurality of data streams according to a spatial division multiplexing access (SDMA) scheme.

To perform beamforming or to select at least one terminal from the plurality of terminals (1, 2, K) 120, 130, and 140, the base station 110 may need to verify channel information associated with downlink channels. In particular, the base station 110 may select at least one terminal from the plurality of terminals (1, 2, K) 120, 130, and 140 using various user selection algorithms, for example, a greedy user selection (GUS) algorithm, a semi-orthogonal user selection (SUS) algorithm, and the like, based on the channel information.

The base station 110 may transmit pilot signals to the plurality of terminals (1, 2, K) 120, 130, and 140 via respective downlink channels. The pilot signal denotes a signal known to the plurality of terminals (1, 2, K) 120, 130, and 140. Each of the terminals (1, 2, K) 120, 130, and 140 may estimate the downlink channels formed between the base station 110 and the plurality of terminals (1, 2, K) 120, 130, and 140 using the pilot signals. Each of the terminals (1, 2, K) 120, 130, and 140 may provide, to the base station 110, feedback information associated with the estimated downlink channels.

The base station 110 may select at least one terminal from the plurality of terminals (1, 2, K) 120, 130, and 140 based on the feedback information. Here, it is assumed that the plurality of terminals (1, 2, K) 120, 130, and 140 is selected as active terminals.

In this instance, the base station 110 may determine a precoding matrix in order to precode or perform beamforming of a plurality of data streams for the plurality of terminals (1, 2, K) 120, 130, and 140 based on the feedback information. In particular, the base station 110 may determine the precoding matrix by selecting, as precoding vectors, a portion of the vectors included in the codebook based on the feedback information.

To increase a throughput of the multi-user MIMO communication system, of FIG. 1, each of the terminals (1, 2, K) 120, 130, and 140 may need to recognize a precoding vector corresponding to each of the terminals (1, 2, K) 120, 130, and 140, and corresponding remaining precoding vectors. For example, it is assumed that a precoding matrix includes precoding vectors $v_1$, $v_2$, and $v_3$. Here, each of $v_1$, $v_2$, and $v_3$ denotes a precoding vector for the respective terminals (1, 2, K) 120, 130, and 140.

The terminal (1) 120 may need to recognize $v_1$ as a precoding vector for the terminal (1) 120, and to recognize $v_2$ and $v_3$ as remaining precoding vectors that are interference vectors with respect to the precoding vector $v_1$. Similarly, terminal (2) 130 may need to recognize $v_2$ as a precoding vector for the terminal (2) 130, and to recognize $v_1$ and $v_3$ as remaining precoding vectors that are interference vectors with respect to the precoding vector $v_2$. The terminal (K) 140 may need to recognize $v_3$ as a precoding vector for the terminal (K) 140, and to recognize $v_1$ and $v_2$ as remaining precoding vectors that are interference vectors with respect to the precoding vector $v_3$.

The base station 110 may transmit, to each of the terminals (1, 2, K) 120, 130, and 140, feedforward information containing indicators used to identify a precoding vector and remaining precoding vectors. Each of the terminals (1, 2, K) 120, 130, and 140 may recognize a corresponding precoding vector and remaining precoding vectors based on the feedforward information.

The base station 110 may generate a transmission signal by performing beamforming of data streams using precoding vectors included in the precoding matrix. Since each of the terminals (1, 2, K) 120, 130, and 140 is aware of the corresponding precoding vector and the remaining precoding vectors, it is possible to cancel interference in a received signal.

FIG. 2 illustrates an example to describe a precoding vector indicator and an interference vector indicator.

Prior to describing FIG. 2, it is assumed that a base station installed with M transmit antennas and a plurality of users (terminals) use the same codebook C. Here, the codebook C includes L unitary matrices, and each of the unitary matrices has a size of M×M. In this case, the codebook C may be represented by $\{B^{(1)}, B^{(2)}, \ldots, B^{(L)}\}$, and a codebook size that is a number of column vectors included in the codebook may be Nq=LM. The codebook C may be represented by $\{v_1, v_2, \ldots, v_{Nq}\}$.

Referring to FIG. 2, k, i, j, and m denote indexes of users, and each of $u_k$, $u_i$, $u_j$, and $u_m$ denotes a precoding vector for each of users k, i, j, and m. Here, $u_i$, $u_j$, and $u_m$ correspond to remaining precoding vectors with respect to the precoding vector $u_k$ for the user k, that is, correspond to interference vectors.

To represent one vector among Nq vectors, $\log_2(Nq)$ bits may be used. When a number of users simultaneously served is $P_{SDMA}$, the base station may use $P_{SDMA} \times \log_2(Nq)$ bits in order to represent the precoding vector $u_k$ for the user k and the remaining precoding vectors $u_i$, $u_j$, and $u_m$.

That the base station transmits indicators with respect to a precoding vector and remaining precoding vectors to a plurality of users is referred to as precoding matrix indicator (PMI) signaling. The PMI signaling may be performed via a physical downlink control channel (PDCCH), which may cause great overhead in a communication system. The overhead may deteriorate a throughput of the communication system and thus there is a desire for technology for effective PMI signaling using small overhead.

Figure 3:
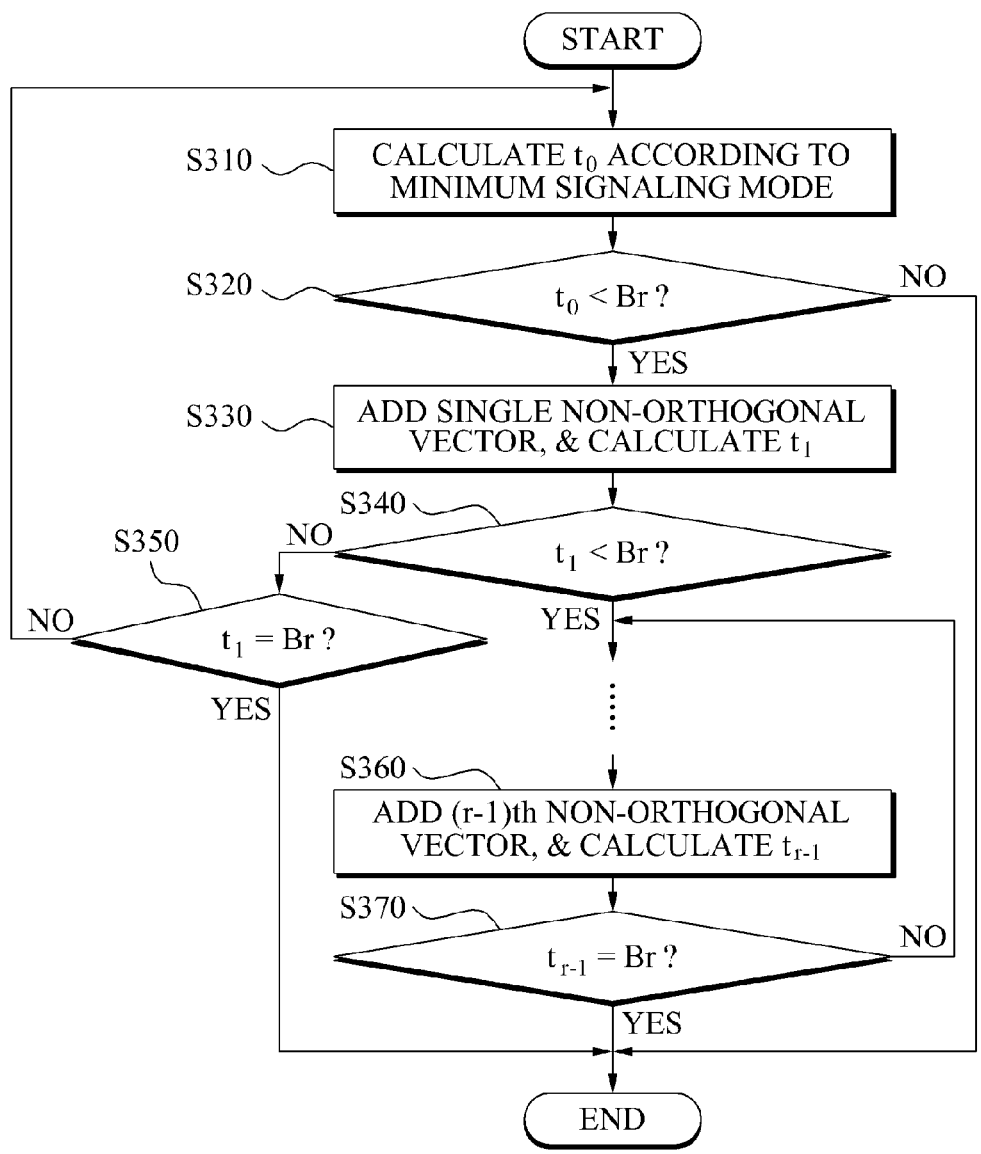
FIG. 3 is a flowchart illustrating an example of determining a mode of constituting a mapping table.

FIG. 3 illustrates an example of determining a mode of constituting a mapping table.

Prior to describing FIG. 3, it is assumed that M transmit antennas are installed in a base station and K active users exist. In addition, it is assumed that $N_r$ receive antennas are installed in each of the active users, and the base station and the active users use a codebook $C = \{v_1, v_2, \ldots, v_{Nq}\}$. Here, each of $v_1$, $v_2$, and $v_{Nq}$ denotes a column vector having a size of M×1, and a rank r denotes a number $P_{SDMA}$ of users simultaneously served. It is assumed that there is a constraint that a size of PMI signaling with respect to rank r needs to be less than $B_r$.

1. Various Modes of Constituting a Mapping Table:

(1) A mode (minimum signaling mode) of constituting a mapping table where a plurality of vectors included in a codebook is classified into orthogonal vectors with respect to a target precoding vector $u_k$ and non-orthogonal vectors.

TABLE 1

| Target precoding vector indicator | Interference vector indicator | |
|---|---|---|
| $\log_2(C_{Nq}^1)_{bits}$ $u_k$ | $t = \log_2(C_{M-1}^{r-1} + 1)_{bits}$ Representation for each of orthogonal vectors | Consider, as one case all of non-orthogonal vectors |

The base station may configure the mapping table as shown in Table 1. A user k may also configure the same mapping table using the same scheme as the base station.

The base station may generate a precoding vector indicator indicating the target precoding vector $u_k$ using $\log_2(C_{Nq}^1)$ bits. For example, when Nq is 8, the precoding vector indicator may represent the target precoding vector $u_k$ using three bits.

To generate an interference vector indicator indicating remaining precoding vectors excluding the target precoding vector $u_k$, the base station may classify Nq vectors, included in the codebook, into orthogonal vectors with respect to the target precoding vector $u_k$ and non-orthogonal vectors. The base station may individually represent each of the orthogonal vectors with respect to the target precoding vector $u_k$, and may represent the non-orthogonal vectors as one case (½ bits).

For example, when it is assumed that among $v_1$, $v_2$, $v_3$, $v_4$, ..., $v_{Nq=8}$, orthogonal vectors with respect to a target precoding vector $v_1$ are $v_2$, $v_3$, and $v_4$, and remaining vectors excluding the orthogonal vectors correspond to non-orthogonal vectors, an interference vector indicator may be represented by two bits. For example, the base station may map $v_2$ to '00', map $v_3$ to '01', and map $v_4$ to '10'. The base station may map all of the remaining vectors to '11'. When at least one among the remaining precoding vectors excluding the target precoding vector $v_1$ from precoding vectors included in the precoding matrix corresponds to at least one of $v_2$, $v_3$, and $v_4$, the base station may determine, as the interference vector indicator, at least one of '00', '01', and '10'. When none of the remaining precoding vectors correspond to one of $v_2$, $v_3$, and $v_4$, the base station may determine '11' as the interference vector indicator. The base station may generate the interference vector indicator using 2 bits.

When a precoding matrix includes a target precoding vector, probabilities that a plurality of vectors included in a codebook may be included in the precoding matrix may be diversified. In a general case, it is possible to predict that a probability that orthogonal vectors with respect to the target precoding vector may be included in the precoding matrix is relatively high, and a probability that non-orthogonal vectors may be included in the precoding matrix is relatively low. Using this, the base station may configure the mapping table that may individually identify each of the orthogonal vectors and consider the non-orthogonal vectors as one case.

Referring to FIG. 3, in operation S310, a base station may calculate to according to a minimum signaling mode. Here, $t_0 = \log_2(C_{Nq}^1) + \log_2(C_{M-1}^{r-1} + 1)$. In a mapping table according to the minimum signaling mode, bits for an interference vector indicator and a plurality of vectors included in a codebook may be mapped to each other in order to individually identify orthogonal vectors. Non-orthogonal vectors may be considered as one case.

According to an embodiment, the base station may configure the mapping table to individually identify one portion of the non-orthogonal vectors.

In operation S320, the base station may compare $t_0$ and $B_r$.

When $t_0$ is greater than or equal to $B_r$, the base station may finally determine the mapping table that is configured according to the minimum signaling mode, and terminate a process of determining a mode of constituting the mapping table. An interference vector indicator may be generated according to the mapping table and then be provided to a user.

(2) A mode of constituting a mapping table to additionally select at least one non-orthogonal vector with respect to a target precoding vector $u_k$:

Conversely, when $t_0$ is less than $B_r$, the base station may modify the mapping table to additionally individually identify a single non-orthogonal vector, and may, calculate a size $t_1$ of PMI signaling corresponding to the modified mapping table in operation S330.

The modified mapping table may inform a user about a remaining precoding vector more accurately than the mapping table according to the minimum signaling mode, however, may have a greater size $t_1$ of PMI signaling. A calculation process of $t_1$ will be described later.

The added single non-orthogonal vector may be determined based on a similarity between the plurality of vectors and the target precoding vector $u_k$, or interference of the vectors with respect to the target precoding vector $u_k$. Here, the similarity between the plurality of vectors and the target precoding vector $u_k$, or the interference of the vectors with respect to the target precoding vector $u_k$ indicates a concept corresponding to the probability that the plurality of vectors may be included in the precoding matrix.

A signal to interference ratio $(SIR)_{i,j}$ of an $i^{th}$ beam vector with respect to a $j^{th}$ beam vector may be represented by the following Equation 1:

$$SIR_{i,j} = \min_{\theta \in \alpha_j} \left| \frac{A_i(\theta)}{A_j(\theta)} \right|^2 \quad \text{[Equation 1]}$$

$$A_i(\theta) = |\text{space}(\theta) u_i^H|$$

$$\text{space}(\theta) = \left[ 1, e^{-j\frac{2\pi}{\lambda}d\sin\theta}, \ldots, e^{-j\frac{2\pi}{\lambda}(n-1)d\sin\theta} \ldots e^{-j\frac{2\pi}{\lambda}(M-1)d\sin\theta} \right]$$

In Equation 1, $\alpha_i$ denotes a spatial angle interval where a beamforming gain of an $i^{th}$ beam is maximized, $\theta$ denotes a spatial angle belonging to $\alpha_i$, and $A_i(\theta)$ denotes the beamforming gain of the $i^{th}$ beam to the spatial $\theta$ angle. Also, $u_i$ denotes the $i^{th}$ beam vector, $\lambda$ denotes a wavelength, d denotes an interval between transmit antennas, and n denotes an index of a transmit antenna.

In operation S340, the base station may compare the calculated size $t_1$ of PMI signaling and the predetermined constraint $B_r$.

When $t_1$ is greater than or equal to $B_r$, the base station may verify whether $t_1$ is equal to $B_r$ in operation S350. When $t_1$ is equal to $B_r$, the base station may terminate all the process and finally determine the mapping table generated in operation S330. Conversely, when $t_1$ is not equal to $B_r$, operation S310 may be repeated.

When $t_1$ is less than $B_r$, the base station may modify the mapping table to additionally individually identify another non-orthogonal vector. By repeating the above process, the base station may modify the mapping table to additionally individually identify an $(r-1)^{th}$ non-orthogonal vector and calculate $t_{r-1}$ in operation S360.

In operation S370, the base station may verify whether the calculated $t_{r-1}$ is equal to $B_r$. When $t_{r-1}$ is equal to $B_r$, the base station may finally determine the mapping table generated in operation S360, and otherwise, may repeat the previous operation. The previous operation may be an operation of calculating the mapping table to additionally individually identify the $(r-1)^{th}$ non-orthogonal vector and calculate $t_{r-1}$.

q non-orthogonal vectors with respect to the target precoding vector $u_k$ added to be individually identified from the mapping table may be selected through the following process. Here, q denotes $1, 2, \ldots, r-1$.

Orthogonal basis setup: calculate all the probable sets. In this instance, each of the sets may include (r–q) vectors, and (r–q) vectors (target precoding vector $u_k$ and (r–q–1) vectors) are orthogonal with respect to each other. The above sets are referred to as $A_w$, $w=1, 2, \ldots, C_{M-1}^{r-q-1}$.

Probable sets of q non-orthogonal vectors added to be individually identified from the mapping table with respect to the target precoding vector $u_k$ may be found based on $A_w$, $w=1, 2, \ldots, C_{M-1}^{r-q-1}$. Here, the probable sets of the q non-orthogonal vectors are referred to as $B_w^y$, $y=1, \ldots, G$. In this instance, G denotes a number of combinations of the q non-orthogonal vectors obtained from the codebook C, and y denotes the specific q non-orthogonal vectors selected based on $A_w$, $w=1, 2, \ldots, C_{M-1}^{r-q-1}$. All the y may be found using the following Equation 2:

$$y = \arg\left\{ \min\left\{ \underset{\forall v_i, v_j \in B_w^y}{SIR_{i,j}}, \underset{\forall v_i \in B_w^y, \forall v_j \in A_w}{SIR_{i,j}}, \underset{\forall v_i \in A_w, \forall v_j \in B_w^y}{SIR_{i,j}} \right\} \geq \text{Threshold} \right\} \quad \text{[Equation 2]}$$

$$t_{q-1} = \log_2(P_{q-1} + P_{added,q} + 1)$$

bits corresponding to the size of PMI signaling may be calculated. Here, $P_{q-1}$ denotes all the possible cases, that is, possibilities in the mapping table generated in the previous operation, and $P_{added,q}$ denotes cases added to the mapping table in the current operation. Also, +1 denotes all of unselected vectors.

When (q–1) non-orthogonal vectors are added to be individually identified, the mapping table may be represented by the following Table 2:

TABLE 2

| Precoding vector indictor $\log_2(C_{Nq}^1)$ | Interference vector indicator $t_{q-1} = \log_2(P_{q-1} + P_{added,q} + 1)_{bits}$ | | | |
|---|---|---|---|---|
| $u_k$ | Representation for each of orthogonal vectors | Representation for a first non-orthogonal vector | ... | Representation for a $(q-1)^{th}$ non-orthogonal vector | Consider all of remaining vectors as one case |

According to an embodiment, a base station and a user may transmit and receive an interference vector indicator indicating remaining precoding vectors included in a precoding matrix, using the mapping tables shown in Table 1 and Table 2. The base station and the user may determine a mode of constituting the mapping table based on a number of bits for the interference vector indicator, and may generate and use the mapping table corresponding to the determined mode.

(3) A mode of constituting a mapping table to additionally select interference vectors based on a probability that a plurality of vectors may be included in a precoding matrix, using an SIR and the like.

Figure 4:
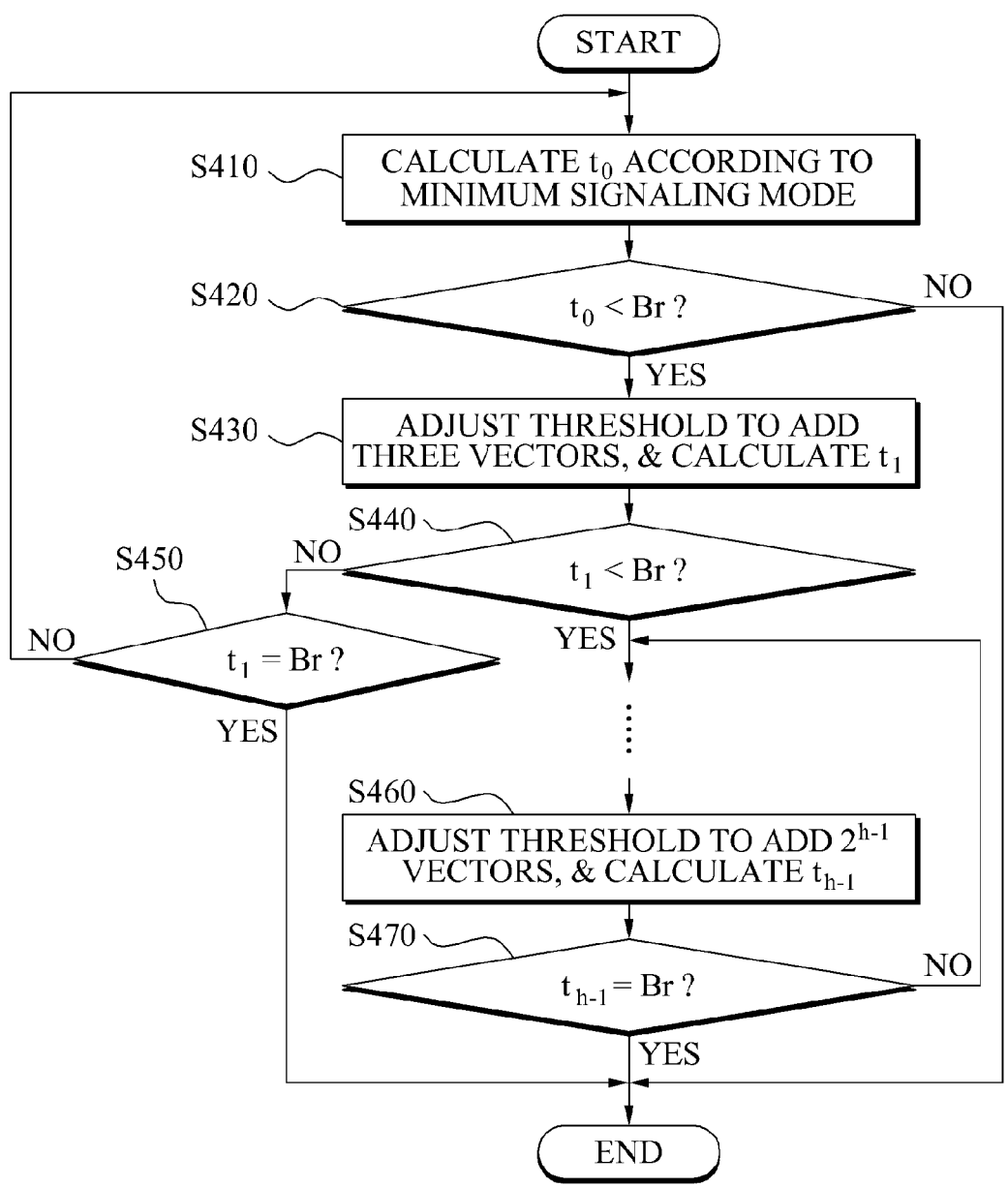
FIG. 4 is a flowchart illustrating another example of determining a mode of constituting a mapping table.

FIG. 4 illustrates another example of determining a mode of constituting a mapping table.

Prior to describing FIG. 4, a base station according to another embodiment may not discriminate orthogonal vectors with respect to a target precoding vector and non-orthogonal vectors in order to select vectors added to the mapping table. For example, to initially add, to the mapping table, the orthogonal vectors with respect to the target precoding vector indicates that a probability of the orthogonal vectors to be determined as precoding vectors together with the target precoding vector is relatively high. Here, the base station according to another embodiment may predict a probability that the plurality of vectors may be included in the precoding matrix together with the target precoding vector without discriminating the orthogonal vectors and the non-orthogonal vectors, and thereby may select vectors desired to be added to the mapping table. In particular, the probability that the plurality of vectors may be included in the precoding matrix together with the target precoding vector may be predicted based on a similarity between the target precoding vector and the plurality of vectors, or an SIR.

Interference vectors with respect to the target precoding vector added to the mapping table may be selected from vectors corresponding to the SIR greater than a predetermined threshold. A number of interference vectors may be adjusted by appropriately changing the threshold.

When a three-bit discrete Fourier transform (DFT) codebook is assumed, a matrix TT may be represented by the following Equation 3:

[Equation 3]

$$TT = \begin{bmatrix} 1.00 & 3.56 & 6.03 & 3.56 & 1.00 & 4.00 & 4.00 & 1.00 \\ 3.25 & 1.00 & 2.96 & 5.19 & 1.00 & 1.00 & 4.20 & 4.09 \\ 5.08 & 2.88 & 1.00 & 4.30 & 3.69 & 1.00 & 1.53 & 3.69 \\ 3.25 & 5.19 & 2.96 & 1.00 & 4.09 & 4.20 & 1.00 & 1.00 \\ 1.00 & 1.00 & 4.16 & 4.25 & 1.00 & 3.05 & 5.04 & 2.85 \\ 4.09 & 1.00 & 1.00 & 4.13 & 3.24 & 1.00 & 3.12 & 5.42 \\ 4.09 & 4.13 & 1.00 & 1.00 & 5.42 & 3.12 & 1.00 & 3.24 \\ 1.00 & 4.25 & 4.16 & 1.00 & 2.85 & 5.04 & 3.05 & 1.00 \end{bmatrix}$$

Here, an element of an $i^{th}$ row and a $j^{th}$ column of the matrix TT corresponds to $\sqrt{SIR_{i,j}}$.

Interference vectors individually identifiable from the mapping table may be selected from the plurality of vectors included in the codebook according to optimization criteria disclosed in the following Equation 4:

[Equation 4]

$$y = \arg\left\{\min\left\{SIR_{i,j}\Big|_{\forall v_i, v_j \in B_w^y, v_i = u_k}, SIR_{i,j}\Big|_{\forall v_j \in B_w^y}, SIR_{i,j}\Big|_{\forall v_i \in B_w^y, v_j = u_k}\right\} \geq Threshold_q\right\}$$

For example, when a rank is 2, it is assumed that $threshold_q$ is $5^2=25$ and $u_k$ denotes a target precoding vector. With respect to $u_k=v_1$, an element of a third row and a first column of the matrix TT is greater than 5 and thus $\{v_3\}$ may be selected as the individually identifiable interference vector from the mapping table. Similarly, $\{v4\}$ may be selected with respect to $u_k=v_2$, and $\{v_1\}$ may be selected with respect to $u_k=v_3$. In addition, $\{v_2\}$ may be selected with respect to $u_k=v_4$, and $\{v_7\}$ may be selected with respect to $u_k=v_5$. Also, $\{v_8\}$ may be selected with respect to $u_k=v_6$, $\{v_5\}$ may be selected with respect to $u_k=v_7$, and $\{v_6\}$ may be selected with respect to $u_k=v_8$.

Also, $threshold_q$ may be adjusted. For example, when $threshold_q$ is $3.6^2=12.96$, $\{v_3\}$, $\{v_6\}$, and $\{v_7\}$ may be selected as interference vectors with respect to $u_k=v_1$, and $\{v_4\}$, $\{v_7\}$, and $\{v_8\}$ may be selected as interference vectors with respect to $u_k=v_2$. Also, $\{v_1\}$, $\{v_5\}$, and $\{v_8\}$ may be selected as interference vectors with respect to $u_k=v_3$, $\{v_2\}$, $\{v_5\}$, and $\{v_6\}$ may be selected as interference vectors with respect to $u_k=v_4$, $\{v_4\}$, and $\{v_7\}$ may be selected as interference vectors with respect to $u_k=v_5$, and $\{v_1\}$, $\{v_4\}$, and $\{v_8\}$ may be selected as interference vectors with respect to $u_k=v_6$. Also, $\{v_1\}$, $\{v_2\}$, and $\{v_5\}$ may be selected as interference vectors with respect to $u_k=v_7$, and $\{v_2\}$, $\{v_3\}$, and $\{v_6\}$ may be selected as interference vectors with respect to $u_k=v_8$.

2. Example of a Mapping Table:

(1) Example of a mode (minimum signaling mode) of constituting a mapping table where a plurality of vectors included in a codebook is classified into orthogonal vectors with respect to a target precoding vector $u_k$ and non-orthogonal vectors:

Here, a case of a 3-bit DFT codebook, four transmit antennas, and a rank 2 may be assumed. A mapping table corresponding to a minimum signaling mode may be represented by Table 3 below. In the DFT codebook, $\{v_1\}$, $\{v_2\}$, $\{v_3\}$, and $\{v_4\}$ may be unitary with respect to each other.

TABLE 3

| Precoding vector indicator (3 bits) | Interference vector indicator (2 bits) |
|---|---|
| 000 $v_1$ | 00 Interference vector1 |
| 001 $v_2$ | 01 Interference vector2 |
| 010 $v_3$ | 10 Interference vector3 |
| 011 $v_4$ | 11 Non-unitary(orthogonal) pairing |
| 100 $v_5$ | |
| 101 $v_6$ | |
| 110 $v_7$ | |
| 111 $v_8$ | |

Referring to Table 3, the interference vector indicator may include two bits. The interference vector indicator may map interference vectors 1, 2, and 3 among a plurality of vectors to '00', '01', and '10', respectively, in order to individually identify the interference vectors 1, 2, and 3. All of remaining vectors excluding the interference vectors 1, 2, and 3 may be mapped to '11'.

For example, the interference vectors 1, 2, and 3 orthogonal to $v_1$ may correspond to $\{v_2\}$, $\{v_3\}$, and $\{v_4\}$, and non-orthogonal vectors with respect to $v_1$ may correspond to $\{v_5\}$, $\{v_6\}$, $\{v_7\}$, and $\{v_8\}$. In this instance, when one of $\{v_2\}$, $\{v_3\}$, and $\{v_4\}$ is included in a precoding matrix, the base station may determine, as the interference vector indicator, one of '00', '01', and '10'. When one of $\{v_5\}$, $\{v_6\}$, $\{v_7\}$, and $\{v_8\}$ is included in the precoding matrix, the base station may determine '11' as the interference vector indicator.

The above example may be applicable to a codebook corresponding to a case where a number of transmit antennas of $3^{rd}$ Generation Partnership Project (3GPP) Long Term Evolution (LTE) disclosed in the following Table 4 is 2.

TABLE 4

| Codebook Index | Number of layers v | |
|---|---|---|
| | 1 | 2 |
| 0 | $\begin{bmatrix}1\\0\end{bmatrix}$ | $\frac{1}{\sqrt{2}}\begin{bmatrix}1 & 0\\0 & 1\end{bmatrix}$ |
| 1 | $\begin{bmatrix}0\\1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\1\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-1\end{bmatrix}$ | — |
| 4 | $\frac{1}{\sqrt{2}}\begin{bmatrix}1\\j\end{bmatrix}$ | — |
| 5 | $\frac{1}{\sqrt{2}}\begin{bmatrix}1\\-j\end{bmatrix}$ | — |

When the rank is 2 in the codebook of the 3GPP LTE, the mapping table may be configured as represented by the following Table 5:

TABLE 5

| Precoding vector indicator (3 bits) | Interference vector indicator (1 bit) |
|---|---|
| 000 $v_1$ | 0 Unitary Pairing |
| 001 $v_2$ | 1 Non-Unitary Pairing |
| 010 $v_3$ | |
| 011 $v_4$ | |
| 100 $v_5$ | |
| 101 $v_6$ | |
| 110 X | |
| 111 X | |

In Table 5, 'Unitary Pairing' denotes the vector $v_2$ orthogonal to $v_1$, and 'Non-Unitary Pairing' denotes $\{v_3\}$, $\{v_4\}$, $\{v_5\}$, and $\{v_6\}$.

(2) Example of a Mapping Table to Additionally Select Interference Vectors Based on an Sir:

Here, a case of a 3-bit DFT codebook, four transmit antennas, and a rank 2 may be assumed. Also, $threshold_q$ of Equation 4 may be assumed as $3.6^2=12.96$. In this instance, the mapping table may be represented by the following Table 6:

TABLE 6

| Precoding vector indicator (3 bits) | Interference vector indicator (2 bits) |
|---|---|
| 000 $v_1$ | 00 Interference vector1 |
| 001 $v_2$ | 01 Interference vector2 |
| 010 $v_3$ | 10 Interference vector3 |
| 011 $v_4$ | 11 Not Covered Case |
| 100 $v_5$ | |
| 101 $v_6$ | |
| 110 $v_7$ | |
| 111 $v_8$ | |

Referring to Equation 6, when $threshold_q$ is $3.6^2=12.96$, three interference vectors may be determined with respect to each target precoding vector. For example, $\{v_3\}$, $\{v_6\}$, and $\{v_7\}$ may be selected as interference vectors with respect to $u_k=v_1$. Here, $\{v_3\}$, $\{v_6\}$, and $\{v_7\}$ may be respectively mapped to '00', '01', and '10'.

Similarly, $\{v_4\}$, $\{v_7\}$, and $\{v_8\}$ may be selected as interference vectors with respect to $u_k=v_2$, $\{v_1\}$, $\{v_5\}$, and $\{v_8\}$ may be selected as interference vectors with respect to $u_k=v_3$, $\{v_2\}$, $\{v_5\}$, and $\{v_6\}$ may be selected as interference vectors with respect to $u_k=v_4$, $\{v_4\}$, and $\{v_7\}$ may be selected as interference vectors with respect to $u_k=v_5$, and $\{v_1\}$, $\{v_4\}$, $\{v_8\}$ may be selected as interference vectors with respect to $u_k=v_6$. Also, $\{v_1\}$, $\{v_2\}$, and $\{v_5\}$ may be selected as interference vectors with respect to $u_k=v_7$, and $\{v_2\}$, $\{v_3\}$, $\{v_6\}$ may be selected as interference vectors with respect to $u_k=v_8$.

Referring to FIG. 4, in operation S410, the base station may calculate $t_0$ according to a minimum signaling mode.

In FIG. 4, the minimum signaling mode denotes adding, to the mapping table, a case one case, that is, possibility. Specifically, the minimum signaling mode may determine, as an interference vector, only a single best vector among the plurality of vectors and enable only the determined interference vector to be individually identifiable, and may consider all of remaining vectors as one case. For example, according to the minimum signaling mode, only $\{v_3\}$ may be selected as the inference vector with respect to the target precoding vector $u_k=v_1$.

In operation S420, the base station may compare $t_0$ and $B_r$. When $t_0$ is greater than or equal to $B_r$, the base station may finally determine the mapping table that is configured according to the minimum signaling mode, and terminate a process of determining a mode of constituting the mapping table. Conversely, when $t_0$ is less than $B_r$, the base station may adjust a threshold of Equation 4 to add three vectors as interference vectors of the mapping table, and may calculate $t_1$ in operation S430.

In operation S440, the base station may compare $t_1$ and $B_r$. When $t_1$ is greater than or equal to $B_r$, the base station may verify whether $t_1$ is equal to $B_r$ in operation S450. When $t_1$ is equal to $B_r$, the base station may terminate all the process and finally determine the mapping table that is generated in operation S430. Conversely, when $t_1$ is not equal to $B_r$, operation S410 may be repeated.

The base station according to an embodiment may repeat a process of adjusting the threshold to sequentially add three vectors and a process of comparing $B_r$ and a size of PMI signaling corresponding to the mapping table modified by adjusting the threshold. The above processes are shown in operations S460 and S470.

When $t_{h-1}$ (h denotes an integer greater than zero) is equal to $B_r$, the mapping table including $2^{h-1}$ interference vectors may be finally determined. Conversely, when $t_{h-1}$ is not equal to $B_r$, a process of generating the mapping table including $2^{h-2}$ interference vectors may be performed again, and all the process may be terminated.

Figure 5:
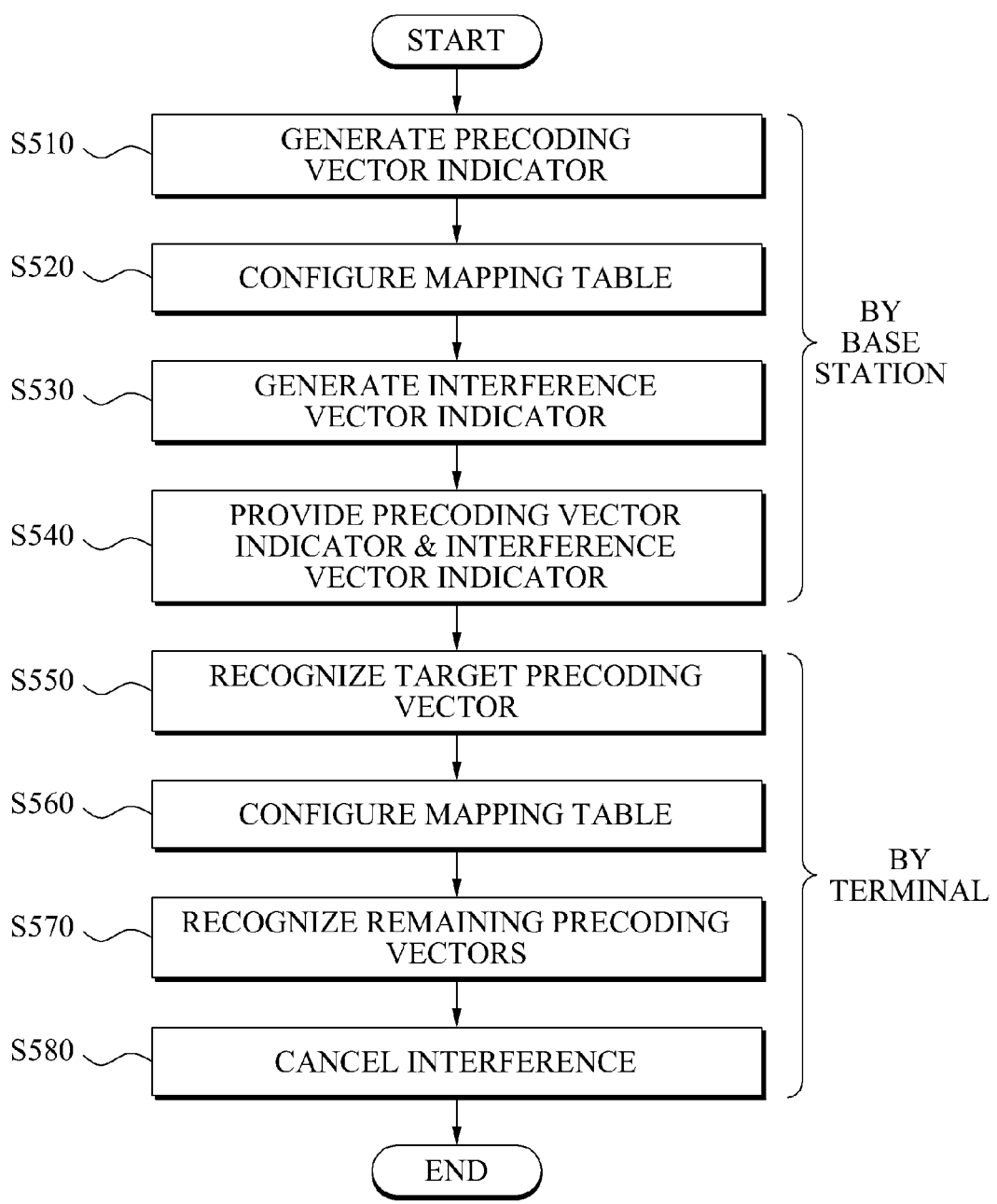
FIG. 5 is a flowchart illustrating an example of operating a base station and a terminal in a MIMO communication system.

FIG. 5 illustrates an example of operating a base station and a terminal in a MIMO communication system.

Referring to FIG. 5, in operation S510, the base station may generate a precoding vector indicator indicating a target precoding vector for a target user among precoding vectors included in a precoding matrix.

In operation S520, the base station may configure a mapping table between at least one bit for an interference vector indicator indicating at least one remaining precoding vector and a plurality of vectors included in a codebook, based on a probability that the plurality of vectors may be included in the precoding matrix.

The base station may configure the mapping table by classifying the plurality of vectors based on the probability that the plurality of vectors may be included in the precoding matrix. For example, only a predetermined number of vectors may be determined as interference vectors of the mapping table in a descending order of the probability that the plurality of vectors may be included in the precoding matrix. In this case, remaining vectors unselected as the interference vectors may be considered as one case.

As described above, the base station may predict the probability that the plurality of vectors may be included in the precoding matrix, based on a similarity between the plurality of vectors and the target precoding vector or interference of the vectors with respect to the target precoding vector. The base station may also determine, as interference vectors of the mapping table, only vectors having a relatively high probability to be included in the precoding matrix compared to a predetermined threshold. Vectors having a relatively low probability to be included in the precoding matrix compared to the predetermined threshold may be considered as one case.

The base station may discriminate orthogonal vectors with respect to the target precoding vector and non-orthogonal vectors, and may configure the mapping table where only the orthogonal vectors are considered as interference vectors.

In operation S530, the base station may generate an interference vector indicator indicating a remaining precoding vector excluding the target precoding vector from the precoding vectors included in the precoding matrix, using one of various mapping tables.

The same mapping table used by the base station may be used by the terminal.

In operation S540, the base station may provide, to the terminal, the generated precoding vector indicator and the interference vector indicator.

In operation S550, the terminal for the target user may recognize the target precoding vector for the target user among the precoding vectors included in the precoding matrix, based on the precoding vector indicator received from the base station.

In operation S560, the terminal for the target user may configure the mapping table according to the same scheme as the base station.

In operation S570, the terminal for the target user may recognize remaining precoding vectors included in the precoding matrix by analyzing the interference vector indicator using the configured mapping table.

In operation S580, the terminal for the target user may cancel in a received data signal using the recognized precoding vector and the remaining precoding vectors.

The processes, functions, methods and/or software described above including a communication method of a base station and a terminal may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and non-transitory computer-readable codes or program instructions may be stored and executed in a decentralized manner.

Figure 6:
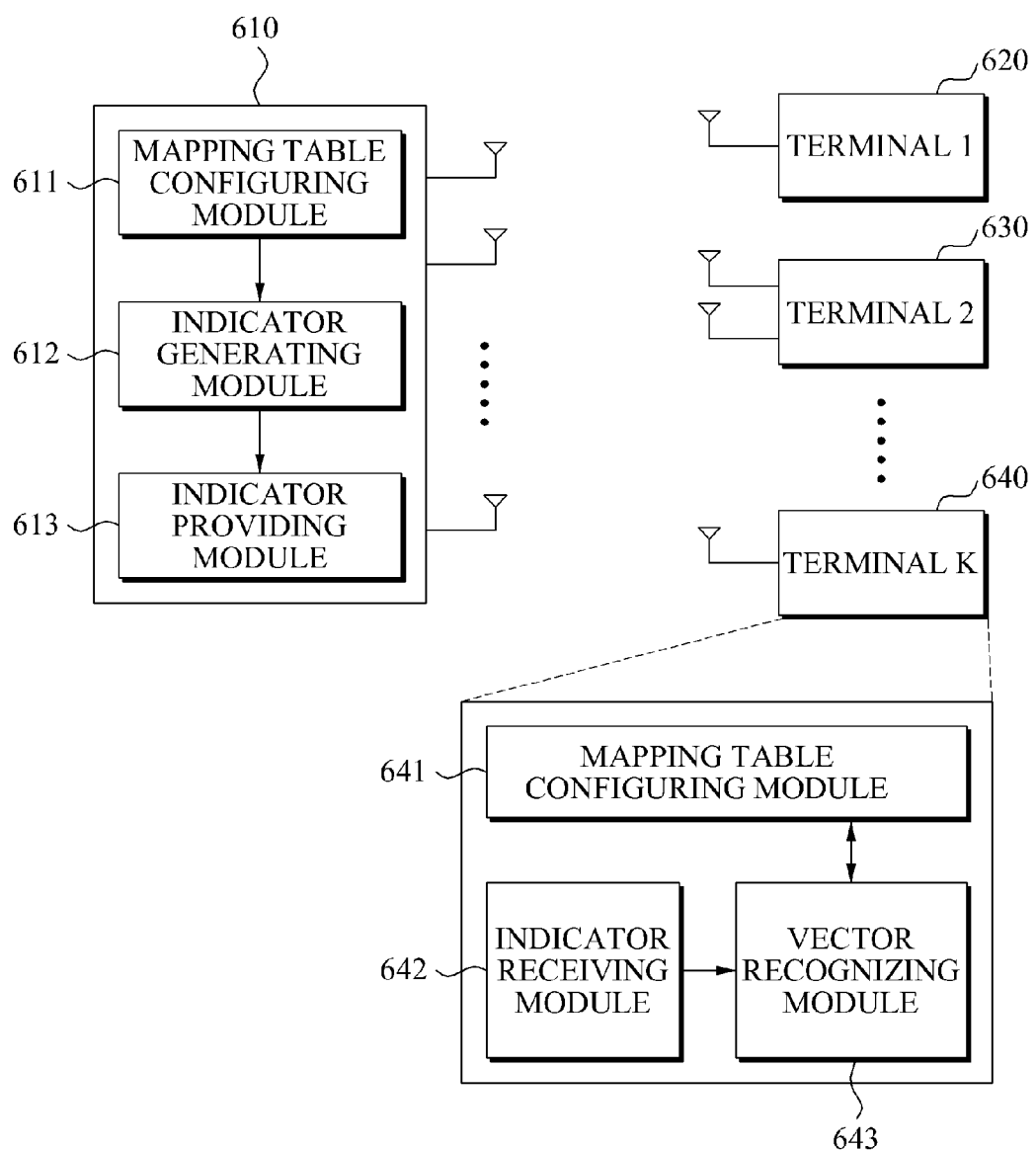
FIG. 6 is a diagram illustrating an example of a base station and a terminal in a MIMO communication system.

FIG. 6 is a diagram illustrating an example of a base station and a terminal in a MIMO communication system.

Referring to FIG. 6, the MIMO communication system may include a base station 610 and K terminals (1, 2, K) 620, 630, and 640.

The base station 610 may include a mapping table configuring module 611, an indicator generating module 612, and an indicator providing module 613.

The mapping table configuring module 611 may configure a mapping table between at least one bit for an interference vector indicator indicating at least one remaining precoding vector and a plurality of vectors included in a codebook, based on a probability that the plurality of vectors may be included in the precoding matrix. The mapping table configuring module 611 may employ principles of configuring the mapping table, described above with reference to FIG. 1 through FIG. 5, and thus further descriptions will be omitted here.

The indicator generating module 612 may generate a precoding vector indicator indicating the target precoding vector, and may generate the interference vector indicator using the mapping table. The indicator providing module 613 may provide the precoding vector indicator and the interference vector indicator to the target user.

The terminal K 640 may include a mapping table configuring module 641, an indicator receiving module 642, and a vector recognizing module 643.

The mapping table configuring module 641 of the terminal K 640 may also configure the mapping table using the same principle as the mapping table configuring module 612 of the base station 610.

The indicator receiving module 642 may receive a precoding vector indicator and an interference vector indicator from the base station 610. The vector recognizing module 643 may recognize the target precoding vector based on the precoding vector indicator, and may recognize the at least one remaining precoding vector by analyzing the interference vector indicator using the mapping table.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a base station in a multiple input multiple output (MIMO) communication system which uses a precoding matrix generated from vectors included in a codebook, the communication method comprising:
   generating a precoding vector indicator that indicates a target precoding vector for a target user from among precoding vectors included in the precoding matrix;
   configuring a mapping table based on the target precoding vector, the mapping table comprising a mapping between interference vector indicators and a plurality of vectors that are included in the codebook, wherein the plurality of vectors are mapped to the interference vector indicators based on a probability that the plurality of vectors are included in the precoding matrix; and
   transmitting the coding vector indicator and an interference vector indicator to the target user.

2. The communication method of claim 1, wherein the configuring comprises configuring the mapping table by classifying the plurality of vectors based on the probability that the plurality of vectors are included in the precoding matrix.

3. The communication method of claim 1, wherein the configuring comprises predicting the probability that the plurality of vectors are included in the precoding matrix, based on a similarity between the plurality of vectors and the target precoding vector, or interference of the vectors with respect to the target precoding vector, and configuring the mapping table.

4. The communication method of claim 1, wherein the configuring comprises configuring the mapping table to separately classify orthogonal vectors with respect to the target precoding vector among the plurality of vectors.

5. The communication method of claim 1, wherein the configuring comprises configuring the mapping table to separately classify vectors having a relatively high probability of being included in the precoding matrix compared to a threshold and vectors having a relatively low probability of being included in the precoding matrix compared to the threshold, among the plurality of vectors.

6. The communication method of claim 1, further comprising:
   determining a mode of constituting the mapping table with respect to a number of bits for the interference vector indicator,
   wherein the configuring comprises configuring the mapping table according to the mode of constituting the mapping table.

7. The communication method of claim 6, wherein the number of bits for the interference vector indicator is adjusted under a predetermined constraint.

8. The communication method of claim 1, wherein the target user configures the same mapping table.

9. A non-transitory computer-readable recording medium storing a program to implement the method of claim 1.

10. The communication method of claim 1, further comprising classifying the plurality of vectors that are included in a codebook into vectors that are orthogonal to the target precoding vector and vectors that are non-orthogonal to the target precoding vector,
   wherein the mapping table individually maps orthogonal vectors to their own respective interference vector indicators, and collectively maps non-orthogonal vectors to a shared interference vector indicator.

11. The communication method of claim 1, wherein an amount of bits used to generate the interference vector indicator is based on the number of orthogonal vectors included in the codebook.

12. A communication method of a terminal for a target user in a MIMO communication system which uses a precoding matrix generated from vectors included in a codebook, the communication method comprising:
   determining a target precoding vector for the target user from among precoding vectors included in the precoding matrix, based on a precoding vector indicator received from a base station;
   configuring a mapping table based on the target precoding vector, the mapping table comprising a mapping between interference vector indicators and a plurality of vectors that are included in the codebook, wherein the plurality of vectors are mapped to the interference indicator based on a probability that the plurality of vectors are included in the precoding matrix; and
   determining remaining precoding vectors included in the precoding matrix by analyzing an interference vector indicator received from the base station using the mapping table.

13. The communication method of claim 12, further comprising:
   cancelling interference existing in a received data signal using the target precoding vector and at least one remaining precoding vector.

14. The communication method of claim 12, wherein the configuring comprises configuring the mapping table by classifying the plurality of vectors based on the probability that the plurality of vectors are included in the precoding matrix.

15. The communication method of claim 12, wherein the configuring comprises predicting the probability that the plurality of vectors are included in the precoding matrix, based on a similarity between the plurality of vectors and the target precoding vector, or interference of the vectors with respect to the target precoding vector, and configuring the mapping table.

16. The communication method of claim 12, wherein the base station configures the same mapping table.

17. A base station for a MIMO communication system which uses a precoding matrix generated from vectors included in a codebook, the base station comprising:
   a mapping table configuring module to configure a mapping table based on a target precoding vector from among vectors included in the precoding matrix, the mapping in table comprising a mapping between interference vector indicators and a plurality of vectors that are included in the codebook, based on a probability that the plurality of vectors are included in the precoding matrix;
   an indicator generating module to generate a precoding vector indicator indicating the target precoding vector, and to generate an interference vector indicator using the mapping table; and
   an indicator providing module to provide the precoding vector indicator and the interference vector indicator to a target user.

18. The base station of claim 17, wherein the mapping table configuring module is configured to predict the probability that the plurality of vectors are included in the precoding matrix, based on a similarity between the plurality of vectors and the target precoding vector or interference of the vectors with respect to the target precoding vector, and to configure the mapping table.

19. A terminal for a target user in a MIMO communication system which uses a precoding matrix generated from vectors included in a codebook, the terminal comprising:
- an indicator receiving module to receive a precoding vector indicator and an interference vector indicator from a base station, and to determine a target precoding vector for the target user based on the precoding vector indicator;
- a mapping table configuring module to configure a mapping table based on the target precoding vector, the mapping table comprising a mapping between interference vector indicators and a plurality of vectors included in the codebook, based on a probability that the plurality of vectors are included in the precoding matrix; and
- a vector recognizing module to determine remaining precoding vectors included in the precoding matrix by analyzing the interference vector indicator using the mapping table.

20. The terminal of claim 19, further comprising:
a processor module to cancel interference existing in a received data signal using the target precoding vector and at least one remaining precoding vector.

* * * * *